United States Patent [19]

Nietupski

[11] Patent Number: 5,097,620

[45] Date of Patent: Mar. 24, 1992

[54] FISHING LURE WITH CHUM PASSAGE

[76] Inventor: Ronald S. Nietupski, 16500 Spaniel Dr., Lockport, Ill. 60441

[21] Appl. No.: 475,332

[22] Filed: Feb. 5, 1990

[51] Int. Cl.[5] .................................................. A01K 85/00
[52] U.S. Cl. .................................... 43/42.06; 43/44.99
[58] Field of Search ................... 43/44.99, 42.06, 18.1, 43/42.09

[56] References Cited

U.S. PATENT DOCUMENTS

| | | | |
|---|---|---|---|
| 1,600,653 | 9/1926 | Steenstrup | 43/42.09 |
| 1,993,798 | 3/1935 | Peterson | 43/42.22 |
| 2,036,075 | 3/1936 | Peterson | 43/42.09 |
| 2,386,105 | 10/1945 | Gambill | 43/42.09 |
| 2,583,660 | 1/1952 | Moore | 43/44.99 |
| 2,608,160 | 8/1952 | Moody | |
| 2,672,113 | 3/1954 | McCartney | |
| 3,015,902 | 1/1962 | Mount | 43/7 |
| 3,305,964 | 7/1963 | Wieszeck | |
| 3,449,852 | 6/1969 | Mitchell | |
| 3,798,823 | 3/1974 | Watters et al. | |
| 3,905,147 | 9/1975 | Snipes | |
| 3,913,257 | 10/1975 | Colgan | 43/42.09 |
| 3,914,895 | 10/1975 | Mize | 43/42.05 |
| 4,098,017 | 7/1978 | Hall | 43/42.06 |
| 4,267,658 | 5/1981 | Brown et al. | |
| 4,438,583 | 3/1984 | Sullivan | 43/42.06 |
| 4,602,453 | 7/1986 | Polley | |
| 4,763,434 | 8/1988 | Horneff | |
| 4,807,387 | 2/1989 | Dougherty | 43/42.09 |
| 4,881,340 | 11/1989 | Davis | 43/42.06 |

Primary Examiner—Richard K. Seidel
Assistant Examiner—Patty E. Hong
Attorney, Agent, or Firm—Todd S. Parkhurst

[57] ABSTRACT

A fishing lure especially adapted for trolling type fishing is disclosed. The lure comprises a generally cylindrical body, a skirt, and chum-dispensing means for dispensing chum through the body. The lure body face and body are so designed as to cause the lure to pitch, roll and yaw as it is pulled through the water, thus emulating a sick or injured fish. The lure thus appeals to the fish's sense of sight, smell, hearing, taste and touch.

15 Claims, 2 Drawing Sheets

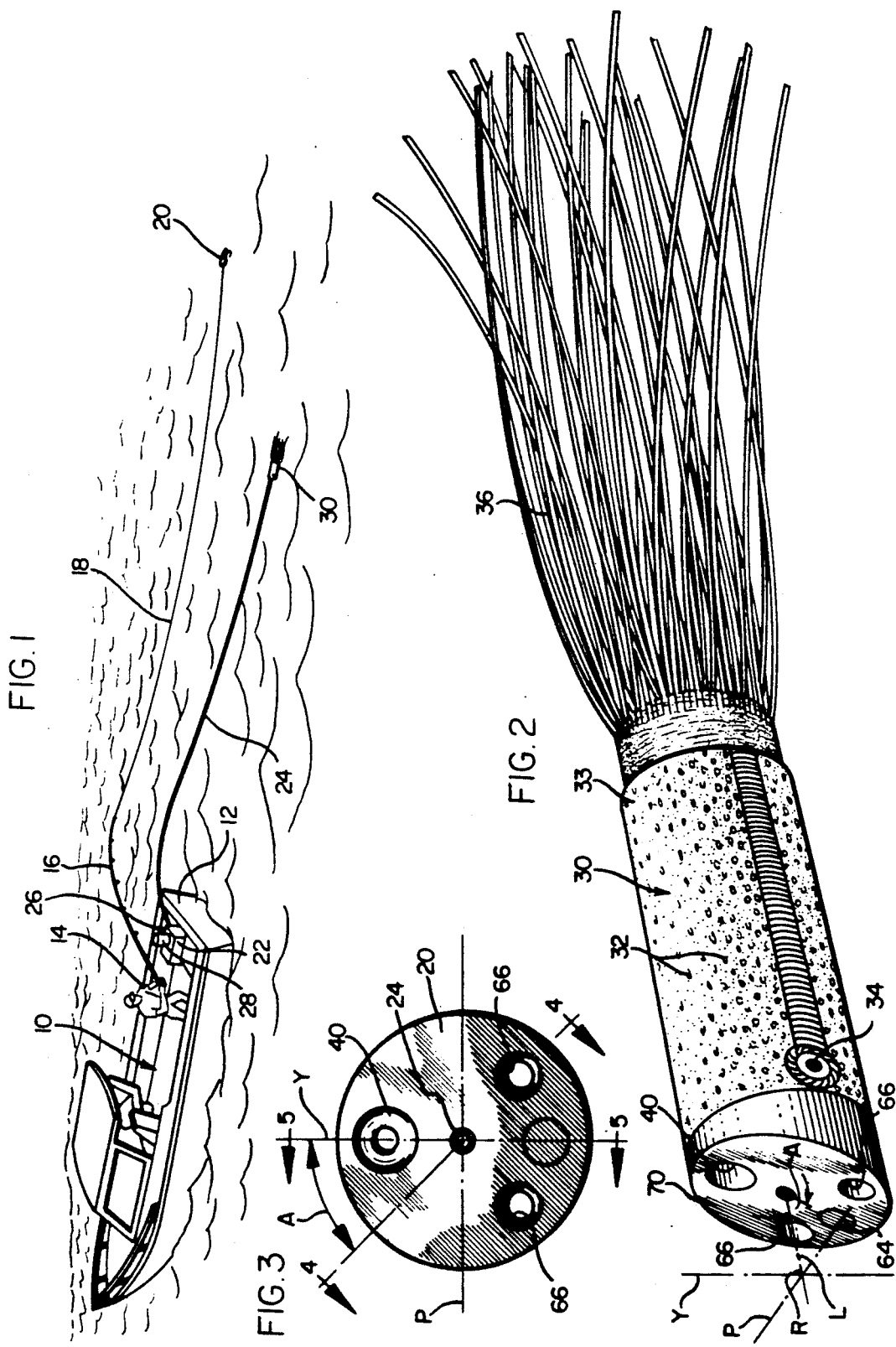

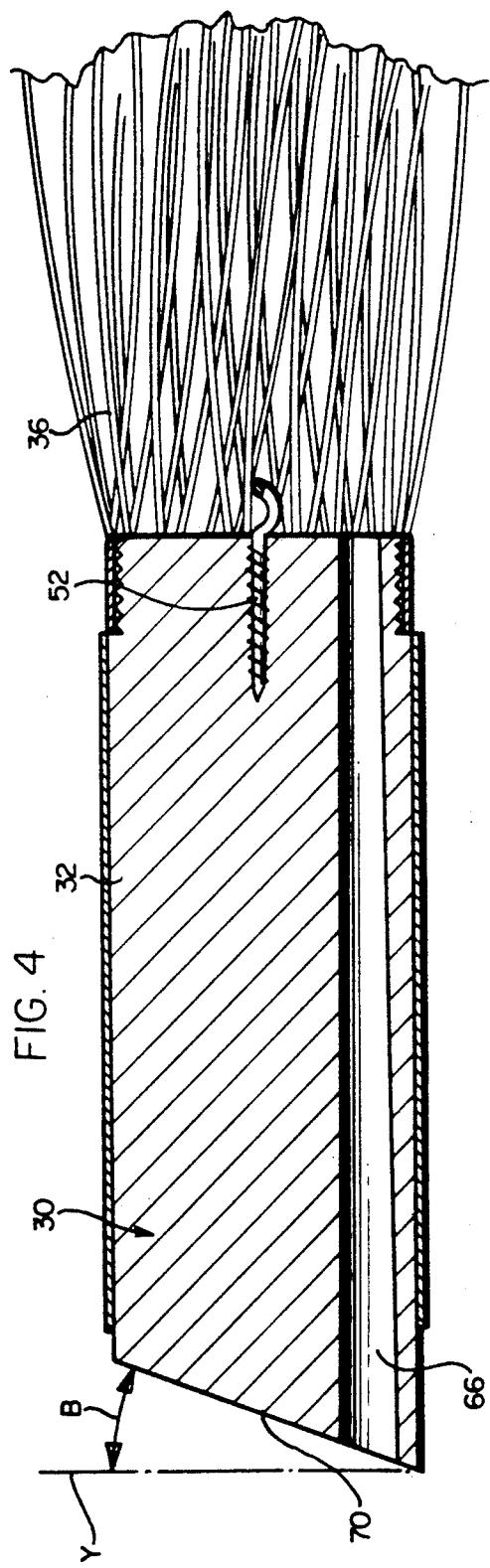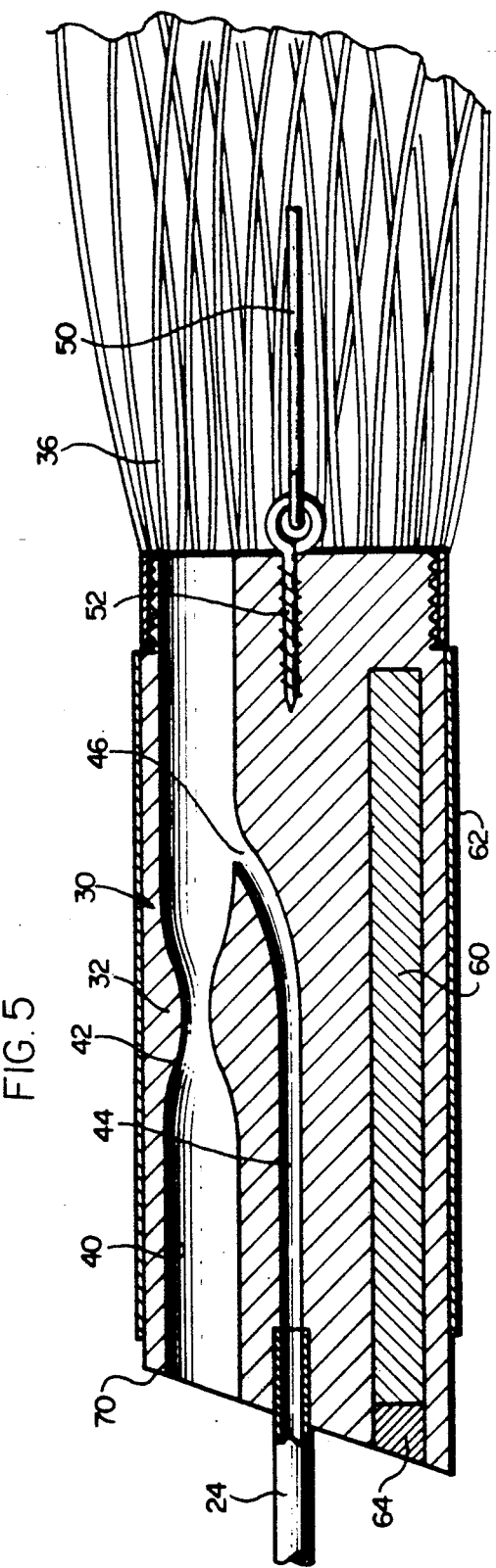

FISHING LURE WITH CHUM PASSAGE

BACKGROUND OF THE INVENTION

This invention relates generally to fishing lures, and more particularly concerns a fishing lure which attracts fish by stimulating the fish's senses of sight, smell, hearing, taste and touch.

Recreational or sport fishing constantly increases in popularity. One of the most exciting and popular varieties of sport fishing involves so-called trolling type fishing, in which a number of lines and lures may be pulled behind and to the side of a fishing boat as the boat moves over the open ocean or lake.

The variety of lures available to sport fisherman is legendary. Some lures have been designed to attract fish by virtue of arresting and attractive color schemes. Other lures attract fish because, when the lures are drawn behind the boat, the lures undergo an oscillatory pitching or rolling motion.

Still other lures are designed to dispense chum, or to be used with chumming operations. The practice of chumming involves the dispensation of various fluids or small particulate matter having a particular odor attractive to the fish sought to be caught by the fishermen. If chum is spread in the water by a lure or near a lure, fish are more likely to be attracted and caught.

It is the general object of the present invention to provide an improved fishing lure which will be highly attractive to fish.

A more specific object of the invention is to provide a lure having an interesting appearance to the fish; which simulates the motion and sound of an injured or wounded fish as the lure is drawn through the water; and which dispenses chum. A related object is to provide a lure in which the visual appearance of the lure can be easily changed, so as to more readily attract various types of game fish.

Other objects and advantages of the invention will become apparent upon reading the following detailed description and upon reference to the drawings. Throughout the drawings, like reference numerals refer to like parts.

BRIEF DESCRIPTION OF THE DRAWING

FIG. 1 is a perspective view showing a typical fishing boat and system as they might appear with the novel lure of the present invention in use;

FIG. 2 is a perspective view of the novel lure;

FIG. 3 is a front elevational view of the lure;

FIG. 4 is a sectional view of the lure taken substantially in the plane of line 4—4 in FIG. 3; and FIG. 5 is a sectional view of the lure taken substantially in the plane of line 5—5 in FIG. 3.

DETAILED DESCRIPTION

While the invention will be described in connection with a preferred embodiment, it will be understood that it is not intended to limit the invention to the described embodiment. On the contrary, it is intended to cover all alternatives, modifications and equivalents as may be included within the spirit and scope of the invention as defined by the appended claims.

Turning first to FIG. 1, there is shown a fishing boat 10, from the stern 12 of which a fisherman 14 is fishing. The fisherman 14 is equipped with a rod 16 of known variety from which trails a line 18 extending to a hooked plug or lure 20.

Mounted at the stern 12 of the boat 10 is a chum dispensing device 22. This chum dispensing device dispenses chum through a hollow tube or towing-and-dispensing conduit 24 extending to a novel teaser lure 30 of the present invention. As illustrated here, the teaser lure 30 is separate from, and is towed separately from, the hooked lure 20. As explained below, however, a hook can be attached to the teaser lure 30 if desired. The chum dispensing device 22 in the boat 10 can include a canister 26 of chum connected to a suitable metering valve 28 or like device. If desired, a separate tow line can be provided, and the dispensing conduit can then be made of lighter, less strong material.

As shown more particularly in FIGS. 2-5, the novel lure 30 includes a body 32 taking the form, in its general aspect, of a closed right cylinder having an imaginary longitudinal axis L. Preferably the body 32 can be made of plastic or other suitable material The outer surface of the body 32 may be covered with any of a number of various visually arresting panels 33. These panels 33 can provide the appearance of crushed pearl, solid pearl, solid colors, glitter in an abstract form, geometric patterns, rainbow, fishscale, mini-fish, squiggle, laser, or other colors or patterns. The panels 33 can be shaped or otherwise provided in a form so as to be slipped over the lure body 30 and snugly attached thereto, or they can be secured to the lure body in any of a number of other known ways. It will also be understood that these panels can be of differing patterns or sorts on the top and on the bottom, so as to more clearly resemble bait attractive to the type of fish being sought. It is contemplated that the panels will be selected by the fisherman who has in mind the type of fish sought, the clarity of the water in which he will be fishing, other environmental influences, geographical location, time of day, month and year, and other known factors.

Eyes 34 can be provided at the forward end of the lure cylinder 32. These eyes can be immobile and formed of a suitable light-reflected material, or they can be of the moveable or button type. Like the panels 33, the eyes can be interchangeable with other eye devices.

Behind the body 30 is a skirt 36, here comprising a plurality of streamers or strands made of a suitable plastic or other material. As the lure 30 is towed through the water, these strands 36 oscillate so as to attract fish. In addition, the skirt strands may produce bubbles; these bubbles provide a further attraction to the fish. It is contemplated that detachable skirts can be offered in a variety of materials and sizes so that the fisherman can select a skirt believed to be most attractive to the type of fish sought.

In accordance with one aspect of the invention, the lure 30 is especially adapted to dispense chum. To this end, as particularly shown in FIGS. 1 and 5, the lure 30 is attached by the chum conduit 24 to a chum dispensing apparatus 22. As particularly shown in FIG. 5, a tube 40 extends through the body 32, and the tube 40 includes a section 42 of reduced diameter to provide a venturi effect. The tow and chum-dispensing conduit 24 extends through the nose 70 and, by an inner passage 44, to a connection point 46 communicating with the venturi tube 40 at a point just downstream of the reduced-diameter venturi area 42. This arrangement provides a positive suction or draw to the chum flowing down the conduit 24. In this way, chum is positively drawn to the lure 30 and positively-dispensed and diffused behind the lure through the skirt 36 and skirt-produced bubbles. The smell, taste and feel of chum become exponentially stronger as the fish swims toward the teaser lure, thereby attracting the fish.

If desired, a hook or secondary lure (not shown) can be attached to the novel lure 30 by means of a line 50 attached, as by any convenient means such as an eyelet 52, to the lure body 32.

In accordance with another aspect of the invention, the lure body simultaneously pitches, yaws and rolls as it is moved through the water, so as to mimic a sick or injured fish. To accomplish this, a weight element 60 is provided at a location adjacent to the body bottom 62 when the lure is in the water. A weight-securing plug 64 may be provided at one end of the lure body 30 to enclose a weight-accepting cavity 65. At locations spaced apart from this weight 60 but in the bottom half of the lure body, tapered roll/yaw stabilizer tubes 66 are provided, as most particularly shown in FIGS. 3 and 4. These roll/yaw stabilizer tubes 66 produce sounds which attract fish, and further control the irregular rolling, pitching, yawing motion of the moving lure. To control trolling depth and to affect roll, yaw and pitch motion, the weight 60 can be varied in amount and its longitudinal location along the body 32.

In addition, rolling, pitching and yawing motion is encouraged by providing a substantially planar nose 70 at the front of the lure body 30. As can be envisioned from a comparison of FIGS. 2, 4 and 5, the plane of the nose 70 is oriented at an acute angle A to the roll axis R, and at an acute angle B to the yaw axis Y. The roll axis is coincident with the body longitudinal axis L. Preferably, the angle A (FIGS. 2 and 3) is substantially 45 degrees, and the angle B (FIG. 4) is substantially 20 degrees.

As the lure 30 is towed through the water, the tubes 66 and skewed planar nose 70 cause the lure to pitch, roll and yaw in a manner like that of a sick or injured fish. This motion attracts predator fish. In addition, the smell, taste and touch of the dispensed chum enhances fish attraction. Further, the bubbles and noise produced by the roll/yaw tubes 66 enhance fish attraction. Still further, the reflective panels 33, eyes 34 and moving skirt 36 attract fish. The result is a lure of surprising attractiveness to the fish being sought.

I claim:

1. A fish lure for movement through a body of water comprising, in combination, a body including a substantially closed right cylinder having a longitudinal axis; an axis of roll substantially coincident with the longitudinal axis, and pitch and yaw axes oriented perpendicularly to the roll axis and to each other; motion means including a substantially planar nose defining part of the body, the plane of the nose being oriented at an acute angle to the pitch axis and at an acute angle to the yaw axis for causing the body to simultaneously pitch, yaw and roll as the body is moved through the water; roll-/yaw stabilizer flow tubes extending through said body to control body pitching, rolling and yawing motion as the lure moves through the water; and chum dispensing means for dispensing chum from the body into the water.

2. A fish lure according to claim 1 wherein said acute angles to the pitch axis and to the yaw axis are different from one another.

3. A fish lure according to claim 2 wherein said acute angle tot he pitch axis is substantially 45 degrees.

4. A fish lure according to claim 2 wherein said acute angle to the yaw axis is substantially 20 degrees.

5. A fish lure according to claim 1 further including skirt means extending rearwardly from said body.

6. A fish lure according to claim 5 wherein said skirt means includes a plurality of streamers which, when moved through the water, produces bubbles for luring fish.

7. A fish lure according to claim 1 wherein said chum dispensing means includes a tube extending through said body, the tube including a section of reduced diameter to provide a venturi effect, and chum dispensing conduit means extending from a remote chum source to said tube.

8. A fish lure according to claim 7 wherein said conduit is adapted to tow said lure.

9. A fish lure according to claim 8 wherein said conduit extends through a body nose.

10. A fish lure according to claim 9 further including weight means located at a position which is located adjacent to the bottom of said fish lure body when the lure is in the water.

11. A fish lure according to claim 1 wherein said roll/yaw stabilizer flow tubes are located in a bottom half of the lure body when the lure is moving through the water.

12. A fish lure according to claim 1 further including hook means attached to and extending rearwardly of said fish lure body.

13. A fish lure according to claim 1 including interchangeable body panels attachable to and detachable from said body.

14. A fish lure according to claim 13 wherein said interchangeable body panels vary in appearance from one another so as to increase attractiveness, taking into account the type of fish sought, the clarity of the water, environmental influences, geographical locations, time of day, month and year and other factors.

15. A fish lure according to claim 1 including interchangeable eyes attachable to and detachable from said body, said eyes being immobile or movable or button type.

* * * * *